No. 666,273. Patented Jan. 22, 1901.
M. M. JOHNSTON.
DEVICE FOR COOKING FEED OR SCALDING HOGS.
(Application filed Apr. 3, 1900.)

(No Model.) 2 Sheets—Sheet 1.

Witnesses: Maxwell M. Johnston, Inventor

By Marion & Marion
Attorneys

No. 666,273. Patented Jan. 22, 1901.
M. M. JOHNSTON.
DEVICE FOR COOKING FEED OR SCALDING HOGS.
(Application filed Apr. 3, 1900.)

(No Model.) 2 Sheets—Sheet 2.

Witnesses:
J. Ed Page
John F. Deuffenniel

Maxwell M. Johnston Inventor
By Marion & Marion
Attorneys

THE NORRIS PETERS CO., PHOTO-LITHO., WASHINGTON, D. C.

UNITED STATES PATENT OFFICE.

MAXWELL M. JOHNSTON, OF EDMONTON, CANADA.

DEVICE FOR COOKING FEED OR SCALDING HOGS.

SPECIFICATION forming part of Letters Patent No. 666,273, dated January 22, 1901.

Application filed April 3, 1900. Serial No. 11,392. (No model.)

*To all whom it may concern:*

Be it known that I, MAXWELL M. JOHNSTON, a subject of Her Majesty the Queen of Great Britain, residing at Edmonton, Alberta, Northwest Territory, Canada, have invented certain new and useful Improvements in Devices for Cooking Feed and Scalding Hogs; and I do hereby declare that the following is a full, clear, and exact description of the invention, such as will enable others skilled in the art to which it appertains to make and use the same.

This invention relates to devices for cooking feed for animals, and also for scalding hogs and other similar purposes; and its object is to provide an apparatus of this character which is simple in construction, effective in operation, and can be manufactured at a moderate cost.

To these ends the invention consists in an apparatus for cooking feed, &c., constructed substantially as hereinafter illustrated and described, and defined in the appended claim.

Figure 1:
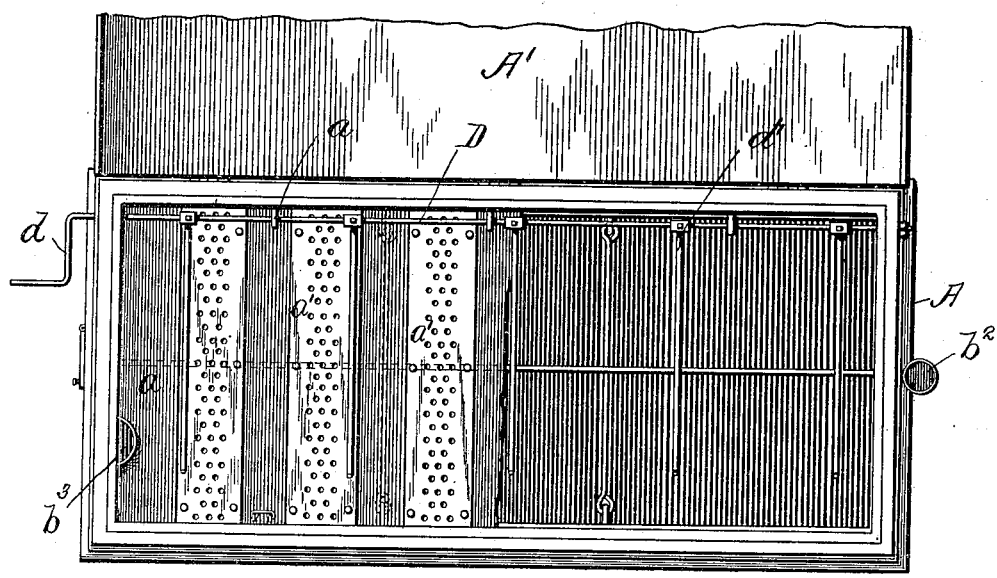
Figure 2:
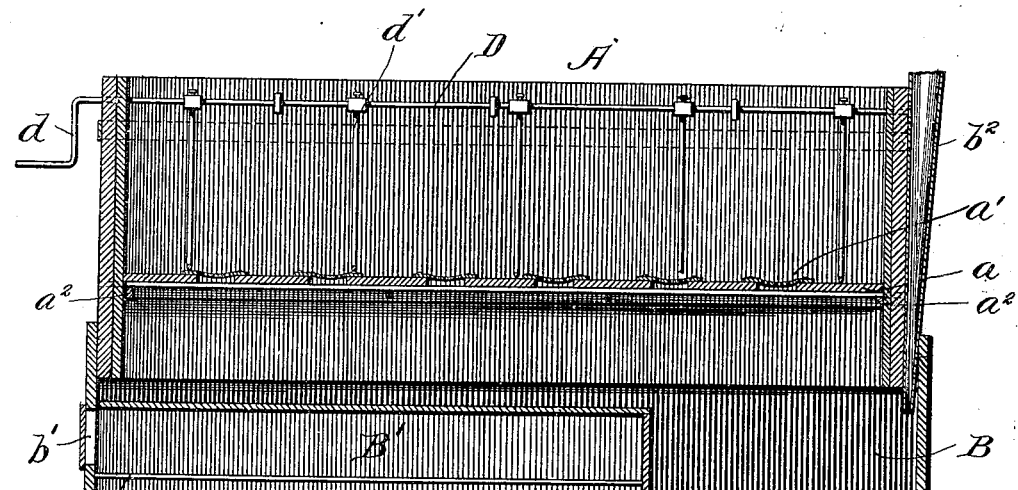
Figure 3:
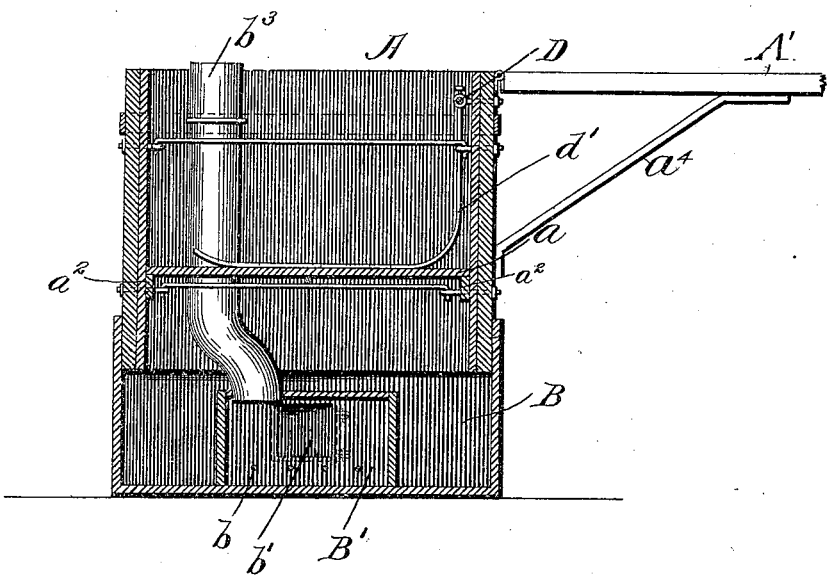
Figure 4:
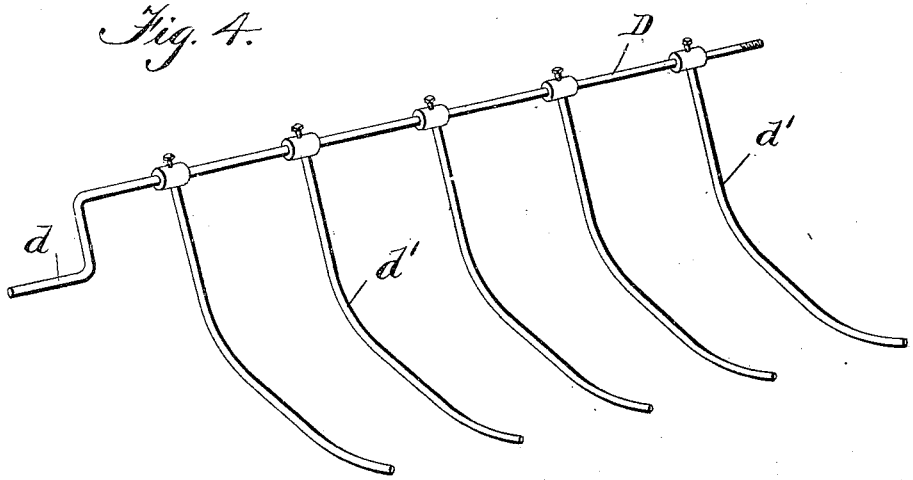

Referring to the drawings, in which similar letters of reference indicate similar parts, Figure 1 is a top view of an apparatus for cooking feed, &c., constructed in accordance with this invention, the cover being shown broken away. Fig. 2 is a vertical longitudinal central section thereof. Fig. 3 is a cross-section with the cover in an open position to serve as a scraping-table, and Fig. 4 is a view in perspective of a means for lifting a hog out of the scalding-tank.

In the drawings, A represents a tank or receptacle which may be of any suitable material and of any shape and dimensions best suited for the intended purpose. The tank is provided with a strong lid or cover A', which is hinged thereto and can be folded back to serve as a table or support whereon the hogs may be laid after having been scalded. By reference to Fig. 3 of the drawings it will be noted that the cover A' is adapted in its open position to rest upon the brackets $a^4$, said brackets being attached to one of the walls of the tank A. These brackets support the table A' in a horizontal position at one side of the tank; but the cover may be folded upon the tank, so as to close the latter when it is desired to cook the feed therein.

The tank A is provided with a removable bottom $a$, which is preferably provided at intervals with perforated slats $a'$, through which the steam is admitted to the grain or other material deposited upon said bottom $a$. The removable bottom $a$ is supported in place by cleats $a^2$, fixed to the tank, and the slots in said bottom may be covered with wire-gauze for the admission of steam, instead of using the perforated slats. When the removable bottom $a$ is provided with the transverse slots, the latter are covered by the slats $a'$, as shown by Fig. 2. Each slat consists of a cross-sectionally-curved metallic plate having a plurality of perforations therein, the curvature of the slats providing a series of gutters on the removable bottom through which the steam is free to circulate, and the water is permitted to pass back into the tank. The grooved slats also provide channels in which a rake or scraper may be easily manipulated for the purpose of removing the material from the tank. Beneath this bottom is a water-chamber B, which is adapted to contain the water to be heated by the fire-box B'. The fire-box B' is preferably rectangular in shape and is of less width and length than the water-box B. Suitable grate-bars $b$ are provided in the fire-box, and an opening $b'$, through which access is to be had to the interior of the fire-box. A smoke-pipe $b^3$ is provided at one end of the water-box, and a water pipe or funnel $b^2$ is provided at the other end of the tank for the purpose of replenishing the water-supply when the tank is charged with feed.

Extending along the entire length of the tank A is the rock-shaft D, which is journaled in suitable bearings near the upper edge and at one side of the tank and is provided at one end with a suitable crank-handle $d$. Along its length the rock-shaft has a plurality of curved lifting-fingers $d'$, upon which the hog is supported when being scalded and by which it may be dumped upon the lid after scalding, so that the lid serves as a table or support for the hog when cleaning the same.

In using the apparatus for scalding hogs the bottom $a$ should be removed and the tank partly filled with water, so that the hog resting on the fingers $d'$ may be immersed in the hot water.

It will be observed by reference to Fig. 3 that the rock-shaft D is journaled in the tank close to the side thereof on which cover A' is hinged, and this shaft may be turned by means of the crank so as to invert the arms $d'$ over the cover or table, whereby the animal which is suspended by the arms $d'$ in the tank may be dumped upon the lid or table for the purpose of conveniently scraping it.

I claim—

A cooking and scalding apparatus comprising a tank having a heater in the water-chamber at the bottom thereof, a removable bottom supported in said tank and provided with transverse slots, the perforated and grooved slats fitted to said bottom over the slots therein, a filling-tube disposed at one end of the tank and communicating with the water-chamber therein, and the rock-shaft provided with the curved arms, substantially as described.

In witness whereof I have hereunto set my hand in the presence of two witnesses.

MAXWELL M. JOHNSTON.

Witnesses:
N. D. BECK,
OLIVE ROSS.